US012001161B2

(12) United States Patent
Homma

(10) Patent No.: US 12,001,161 B2
(45) Date of Patent: Jun. 4, 2024

(54) RECORDING MATERIAL TRANSPORT DEVICE AND IMAGE FORMING APPARATUS

(71) Applicant: FUJIFILM BUSINESS INNOVATION CORP., Tokyo (JP)

(72) Inventor: Naoki Homma, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 657 days.

(21) Appl. No.: 16/774,050

(22) Filed: Jan. 28, 2020

(65) Prior Publication Data

US 2021/0061607 A1 Mar. 4, 2021

(30) Foreign Application Priority Data

Sep. 3, 2019 (JP) ................................ 2019-160750

(51) Int. Cl.
*G03G 15/00* (2006.01)

(52) U.S. Cl.
CPC ........... *G03G 15/70* (2013.01); *G03G 15/502* (2013.01); *G03G 15/652* (2013.01); *G03G 15/6529* (2013.01)

(58) Field of Classification Search
CPC .... G03G 15/70; G03G 15/502; G03G 15/652; G03G 15/6529; B65H 23/26; B65H 26/00; B65H 35/06
See application file for complete search history.

(56) References Cited

U.S. PATENT DOCUMENTS

| | | | | | |
|---|---|---|---|---|---|
| 5,937,245 | A * | 8/1999 | Inoue | G03G 15/0216 | 399/175 |
| 7,590,362 | B2 * | 9/2009 | Yamauchi | G03G 15/55 | 399/407 |
| 7,636,543 | B2 * | 12/2009 | Mandel | G03G 15/6552 | 400/607.2 |
| 9,857,752 | B2 * | 1/2018 | Nishi | G03G 15/55 | |
| 11,467,524 | B2 * | 10/2022 | Shimono | G03G 15/5062 | |
| 2002/0031360 | A1 * | 3/2002 | Umezawa | G03G 15/5004 | 399/67 |

(Continued)

FOREIGN PATENT DOCUMENTS

| | | |
|---|---|---|
| JP | 2005-179019 A | 7/2005 |
| JP | 2016-044022 A | 4/2016 |

(Continued)

OTHER PUBLICATIONS

Apr. 13, 2023 Office Action issued in Chinese Patent Application No. 202010142809.3.

(Continued)

*Primary Examiner* — Nay Tun
(74) *Attorney, Agent, or Firm* — Oliff PLC

(57) ABSTRACT

A recording material transport device includes a transport unit that transports a recording material to a succeeding apparatus that follows the recording material transport device; and a notification unit that, in a case where transport of the recording material by the transport unit has been stopped, gives a notification prompting a user to take an action for reducing occurrence of a trouble resulting from a state where the recording material that has been stopped has already reached the succeeding apparatus.

15 Claims, 9 Drawing Sheets

(56) References Cited

U.S. PATENT DOCUMENTS

| | | | | | |
|---|---|---|---|---|---|
| 2002/0061206 | A1* | 5/2002 | Enomoto | G03G 15/6502 | 399/124 |
| 2003/0190169 | A1* | 10/2003 | Shibaki | B65H 43/04 | 399/21 |
| 2007/0057445 | A1* | 3/2007 | Miyake | B65H 7/14 | 271/256 |
| 2014/0175728 | A1* | 6/2014 | Kimura | G03G 15/6541 | 270/58.08 |
| 2014/0294406 | A1* | 10/2014 | Eguchi | G03G 15/706 | 399/21 |
| 2016/0054697 | A1* | 2/2016 | Tanaka | G03G 15/70 | 399/21 |
| 2018/0024484 | A1* | 1/2018 | Shirasaka | G03G 15/6529 | 399/16 |

FOREIGN PATENT DOCUMENTS

| | | |
|---|---|---|
| JP | 2018-081269 A | 5/2018 |
| JP | 2018-150104 A | 9/2018 |

OTHER PUBLICATIONS

Jul. 11, 2023 Office Action issued in Japanese Patent Application No. 2019-160750.

* cited by examiner

RECORDING MATERIAL TRANSPORT DEVICE AND IMAGE FORMING APPARATUS

CROSS-REFERENCE TO RELATED APPLICATIONS

This application is based on and claims priority under 35 USC 119 from Japanese Patent Application No. 2019-160750 filed Sep. 3, 2019.

BACKGROUND

(i) Technical Field

The present disclosure relates to a recording material transport device and an image forming apparatus.

(ii) Related Art

Japanese Unexamined Patent Application Publication No. 2018-81269 discloses determining whether or not automatic purge can be performed and, in a case where automatic purge can be performed, controlling a paper transport unit to perform automatic purge.

Japanese Unexamined Patent Application Publication No. 2018-150104 discloses causing, upon occurrence of paper jam in a post-processing device, a position at which a sheet of paper has stopped due to the jam to be displayed on a screen of an operation display unit and transporting other sheets of paper that have stopped on transport paths in devices to positions where automatic purge control can be performed.

SUMMARY

In some cases, a transport apparatus that transports a recording material is followed by a succeeding apparatus, and a recording material is transported from the transport apparatus to the succeeding apparatus. If the succeeding apparatus starts transport of a recording material that has stopped so as to be present in both of the transport apparatus and the succeeding apparatus, this recording material is forcibly transported in the transport apparatus. This forced transport may undesirably cause troubles.

Aspects of non-limiting embodiments of the present disclosure relate to reducing occurrence of a trouble resulting from a state where a recording material has already reached a succeeding apparatus that follows a transport apparatus as compared with a case where a user is not prompted to take an action for reducing occurrence of a trouble.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording material transport device including: a transport unit that transports a recording material to a succeeding apparatus that follows the recording material transport device; and a notification unit that, in a case where transport of the recording material by the transport unit has been stopped, gives a notification prompting a user to take an action for reducing occurrence of a trouble resulting from a state where the recording material that has been stopped has already reached the succeeding apparatus.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described below with reference to the attached drawings.

Figure 1:
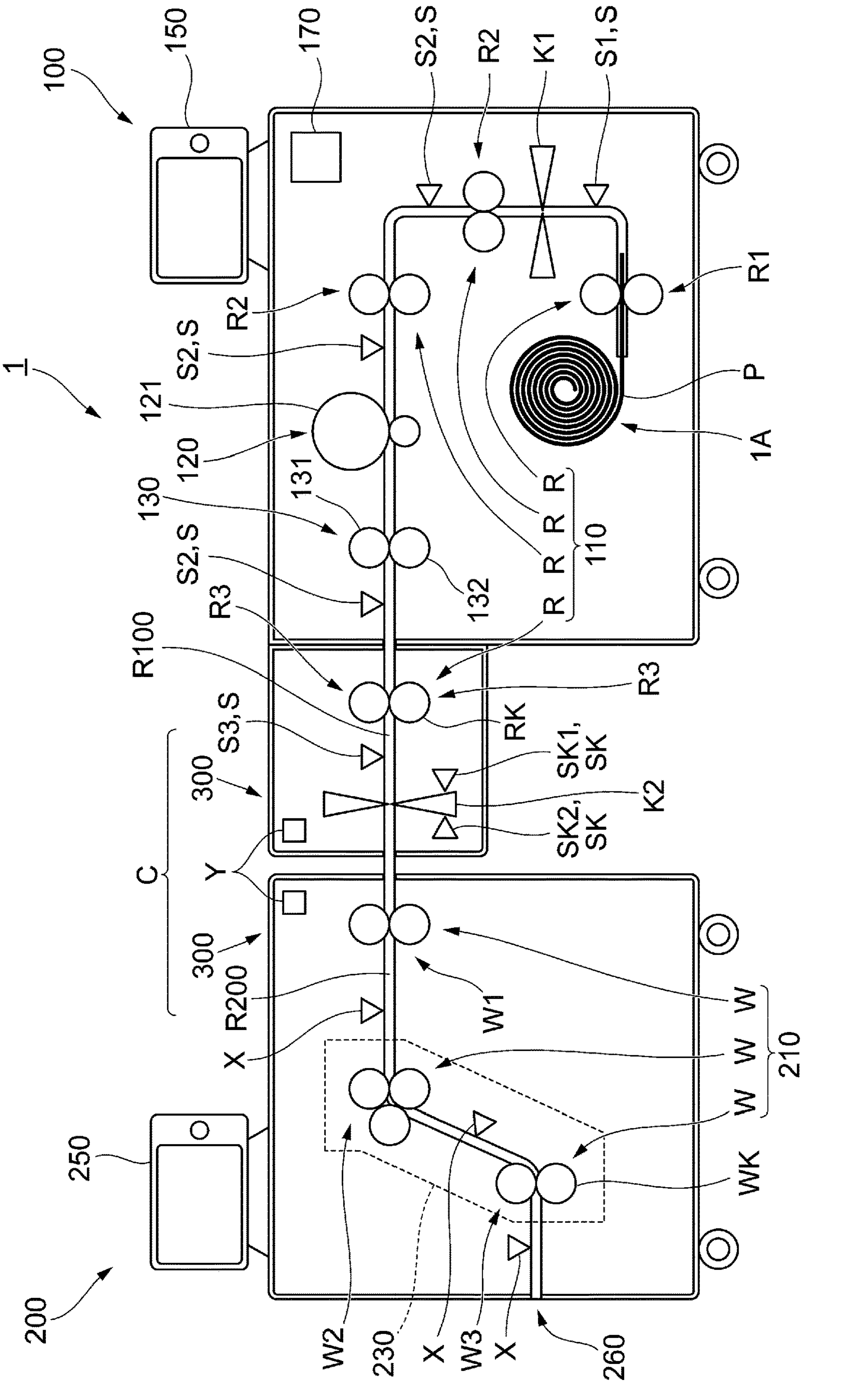
FIG. 1 illustrates an example of a configuration of a paper processing system as viewed from a front side of the paper processing system.

FIG. 1 illustrates an example of a configuration of a paper processing system 1 as viewed from a front side of the paper processing system 1.

The paper processing system 1 illustrated in FIG. 1 includes an image forming apparatus 100 and a paper processing apparatus 200 that follows the image forming apparatus 100.

The image forming apparatus 100 forms an image on a sheet of paper P, which is an example of a recording material.

The paper processing apparatus 200, which is an example of a succeeding apparatus, processes the sheet of paper P transported from the image forming apparatus 100. Specifically, the paper processing apparatus 200 performs folding processing on the sheet of paper P delivered from the image forming apparatus 100 and thereby generates a folded sheet of paper P.

Note that the folding processing is an example, and the paper processing apparatus 200 may perform other kinds of processing such as binding processing, booklet creating processing, or punching processing.

Alternatively, the paper processing apparatus 200 may just transport a sheet of paper P to another succeeding apparatus. That is, examples of the processing performed by the paper processing apparatus 200 include transport of a sheet of paper P.

The image forming apparatus 100 has a transport unit 110 that transports a sheet of paper P. Furthermore, the image forming apparatus 100 has plural paper detection sensors S that detect a sheet of paper P transported by the transport unit 110.

The transport unit 110, which is an example of a transport unit, transports a sheet of paper P to the paper processing apparatus 200, which is a succeeding apparatus.

The transport unit 110 has plural transport roll pairs R. A driving roll RK, which is one of rolls that constitute each of the transport roll pairs R, is driven to transport a sheet of paper P to a downstream side. In this way, the sheet of paper P is delivered to the paper processing apparatus 200.

In the present exemplary embodiment, the transport roll pairs R include an upstream transport roll pair R1 that is on a most upstream side, a downstream transport roll pair R3 that is on a most downstream side, and two intermediate transport roll pairs R2 disposed between the upstream transport roll pair R1 and the downstream transport roll pair R3.

In the image forming apparatus 100 according to the present exemplary embodiment, a roll of paper P indicated by reference sign 1A is sequentially cut by a paper cutter K1 into a rectangular sheet of paper P, and this rectangular sheet of paper P is sequentially fed to the transport unit 110.

The transport unit 110 transports this rectangular sheet of paper P to a downstream side and then to the paper processing apparatus 200.

Although an example in which a roll of paper P is set in the image forming apparatus 100 has been described in the present exemplary embodiment, this configuration is not restrictive. Sheets of cut paper that have been cut in advance may be sequentially fed to the transport unit 110.

The image forming apparatus 100 according to the present exemplary embodiment has a function of transporting a sheet of paper P, which is a recording material. A part of the image forming apparatus 100 that has the function of transporting a sheet of paper P can also be regarded as a recording material transport device.

The plural paper detection sensors S are disposed apart from one another in a paper transport direction.

More specifically, in the present exemplary embodiment, the paper detection sensors S include an upstream paper detection sensor S1 that is on a most upstream side and a downstream paper detection sensor S3 that is on a most downstream side. Furthermore, three intermediate paper detection sensors S2 are provided between the upstream paper detection sensor S1 and the downstream paper detection sensor S3.

Furthermore, the image forming apparatus 100 according to the present exemplary embodiment has an image forming unit 120 that forms an image on a sheet of paper P transported by the transport unit 110.

Furthermore, the image forming apparatus 100 has a fixing unit 130 that fixes an image formed on a sheet of paper P by the image forming unit 120 onto the sheet of paper P.

The image forming unit 120, which is an example of an image forming unit, forms an image on a sheet of paper P according to an electrophotographic system.

The image forming unit 120 has a photoconductor drum 121, which is an example of an image carrier. The image forming unit 120 forms a toner image on the photoconductor drum 121 through exposure on the photoconductor drum 121 and development using toner.

Then, this image formed on the photoconductor drum 121 is transferred onto the sheet of paper P transported by the transport unit 110. In this way, the image is formed on the sheet of paper P.

Note that a method for forming an image on a sheet of paper P is not limited to this. An image may be formed on a sheet of paper P by using other systems such as an inkjet system.

The fixing unit 130 fixes the image on the sheet of paper P transported through the image forming unit 120 onto this sheet of paper P by applying pressure and heat to the sheet of paper P.

More specifically, the fixing unit 130 has a first roll 131 provided with a heat source (not illustrated) and a second roll 132 pressed against the first roll 131. The first roll 131 and the second roll 132 hold a sheet of paper P therebetween and thereby fix an image on the sheet of paper P onto this sheet of paper P.

Furthermore, the image forming apparatus 100 has a cutting blade K2 used to cut a sheet of paper P and cutting blade detection sensors SK that detect the cutting blade K2.

The cutting blade K2 is disposed on a downstream side relative to the fixing unit 130 in a direction in which a sheet of paper P is transported. More specifically, the cutting blade K2 is disposed in a connection part C in which the image forming apparatus 100 and the paper processing apparatus 200 are connected.

In the present exemplary embodiment, the "connection part C" is not limited to a contact part at which the image forming apparatus 100 and the paper processing apparatus 200 are in direct contact with each other and also includes a part around the contact part. In particular, the "connection part C" includes a part of the image forming apparatus 100 that is on an upstream side relative to the contact part and a part of the paper processing apparatus 200 that is on a downstream side relative to the contact part.

The cutting blade K2 is movable in a direction orthogonal to the paper on which FIG. 1 is drawn. In other words, the cutting blade K2 is movable in a direction that crosses the paper on which FIG. 1 is drawn.

In particular, the cutting blade K2 is movable in a direction orthogonal to the direction in which a sheet of paper P is transported. In other words, the cutting blade K2 is movable in a direction that crosses the direction in which a sheet of paper P is transported.

More specifically, the cutting blade K2 is movable from a rear side to a front side of the image forming apparatus 100 and from the front side to the rear side of the image forming apparatus 100.

In the present exemplary embodiment, the sheet of paper P is cut by moving the cutting blade K2 from the rear side to the front side of the image forming apparatus 100 or the sheet of paper P is cut by moving the cutting blade K2 from the front side to the rear side of the image forming apparatus 100.

The cutting blade detection sensors SK include two cutting blade detection sensors SK, one of which is a cutting blade detection sensor SK1 provided on the rear side of the image forming apparatus 100, and the other one of which is a cutting blade detection sensor SK2 provided on the front side of the image forming apparatus 100.

In the present exemplary embodiment, the cutting blade K2 moves when cutting the sheet of paper P. The movement causes a shift from a state where the cutting blade K2 is being detected by the cutting blade detection sensor SK1 to a state where the cutting blade K2 is being detected by the cutting blade detection sensor SK2. Alternatively, the movement causes a shift from a state where the cutting blade K2 is being detected by the cutting blade detection sensor SK2 to a state where the cutting blade K2 is being detected by the cutting blade detection sensor SK1.

In the present exemplary embodiment, it is determined whether or not a sheet of paper P has been cut by the cutting blade K2 based on output from the two cutting blade detection sensors SK.

In particular, in the present exemplary embodiment, it is determined that a sheet of paper P has been cut by the cutting blade K2 in a case where there occurs a shift from a state where the cutting blade K2 is being detected by the cutting blade detection sensor SK1 to a state where the cutting blade K2 is being detected by the cutting blade detection sensor SK2 or a shift from a state where the cutting blade K2 is being detected by the cutting blade detection sensor SK2 to a state where the cutting blade K2 is being detected by the cutting blade detection sensor SK1.

Furthermore, the image forming apparatus 100 according to the present exemplary embodiment has a display device 150 used to notify a user of information.

Furthermore, in the present exemplary embodiment, a control device 170 that controls each unit of the image forming apparatus 100 is provided.

In the present exemplary embodiment, each unit of the paper processing apparatus 200 is also controlled by the control device 170 provided in the image forming apparatus 100. Note that each unit of the paper processing apparatus 200 may be controlled by a control device (not illustrated) provided in the paper processing apparatus 200.

Next, the paper processing apparatus 200 is described.

The paper processing apparatus 200, which is an example of a succeeding apparatus, has a transport unit 210 that transports a sheet of paper P transported from the image forming apparatus 100. The transport unit 210 has plural transport roll pairs W. A driving roll WK, which is one of rolls that constitute each of the transport roll pairs W, is driven to transport the sheet of paper P to a downstream side.

In the present exemplary embodiment, the transport roll pairs W include an upstream transport roll pair W1 that is on a most upstream side and a downstream transport roll pair W3 that is on a most downstream side. Furthermore, a single intermediate transport roll pair W2 is disposed between the upstream transport roll pair W1 and the downstream transport roll pair W3.

Furthermore, the paper processing apparatus 200 has a folding mechanism 230 that folds a sheet of paper P.

The folding mechanism 230 has a pressed member (not illustrated) that is pressed against the sheet of paper P. By pressing the pressed member against the sheet of paper P, the sheet of paper P is folded.

Furthermore, the paper processing apparatus 200 has a display device 250 used to notify a user of information.

Furthermore, the paper processing apparatus 200 has a paper output unit 260 from which a sheet of paper P that has been folded is output.

Furthermore, the paper processing apparatus 200 has plural paper detection sensors X that detect a sheet of paper P transported from the transport unit 210. The paper detection sensors X are disposed apart from one another in a direction in which a sheet of paper P is transported.

In the present exemplary embodiment, a cover member 300 that is openable and closable is provided in the connection part C in which the image forming apparatus 100 and the paper processing apparatus 200 are connected.

More specifically, in the present exemplary embodiment, the cover member 300 is provided in both of the image forming apparatus 100 and the paper processing apparatus 200. The cover member 300 also serves as an exterior member on an outer surface of each of the image forming apparatus 100 and the paper processing apparatus 200.

In the present exemplary embodiment, a user can check the transport unit 110, the cutting blade K2, a path R100 on which a sheet of paper P is transported, and other members provided in the image forming apparatus 100 by opening the cover member 300 provided in the image forming apparatus 100.

Furthermore, a user can check the transport unit 210 and a path R200 on which a sheet of paper P is transported in the paper processing apparatus 200 by opening the cover member 300 provided in the paper processing apparatus 200.

Furthermore, the image forming apparatus 100 and the paper processing apparatus 200 each has an opening closing detection sensor Y that detects opening and closing of the cover member 300 provided therein.

Hereinafter, the transport unit 110 provided in the image forming apparatus 100 is referred to as an upstream-side transport unit 110, and the transport unit 210 provided in the paper processing apparatus 200 is referred to as a downstream-side transport unit 210.

Figure 2:
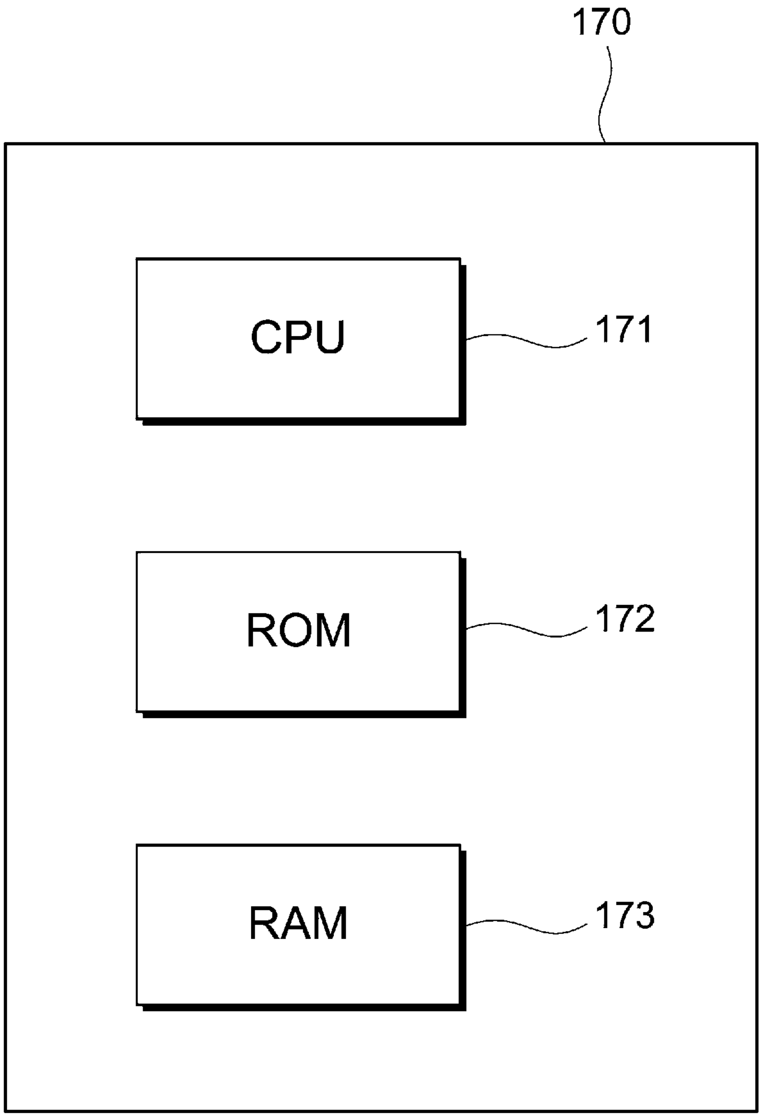
FIG. 2 illustrates an example of a configuration of a control device provided in an image forming apparatus.

FIG. 2 illustrates an example of a configuration of the control device 170 provided in the image forming apparatus 100.

The control device 170 according to the present exemplary embodiment includes a central processing unit (CPU) 171, which is an example of a processor, a read only memory (ROM) 172 in which a control program and the like are stored, and a random access memory (RAM) 173 used as a work area. This control device 170 is a computer.

Figure 3:
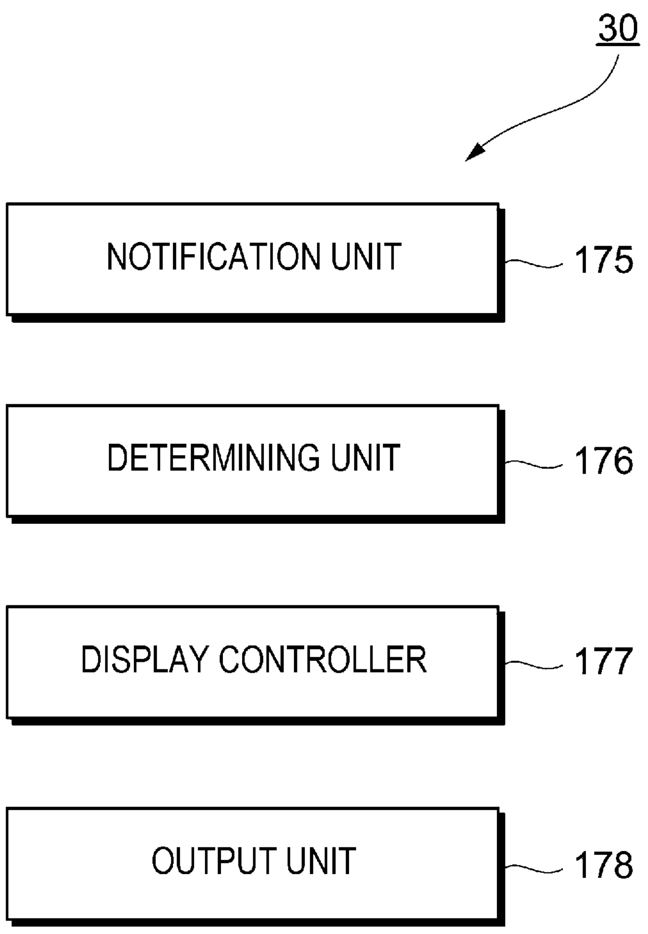
FIG. 3 illustrates functional units realized by execution of programs stored, for example, in a ROM or a hard disk device by a CPU.

FIG. 3 illustrates functional units realized by execution of programs stored, for example, in the ROM 172 or a hard disk device (not illustrated) by the CPU 171.

In the present exemplary embodiment, the CPU 171 executes the programs stored, for example, in the ROM 172 or a hard disk device, and thereby a notification unit 175, a determining unit 176, a display controller 177, and an output unit 178, which are functional units, are realized.

The notification unit 175, which is an example of a notification unit, gives a notification that prompts a user to take an action for reducing occurrence of a trouble in the image forming apparatus 100. For example, the notification unit 175 gives a notification that prompts a user to cut a sheet of paper P.

The determining unit 176, which is an example of a determining unit, determines whether or not a sheet of paper P whose transport by the upstream-side transport unit 110 has been stopped has already reached the paper processing apparatus 200.

The display controller 177, which is an example of a display controller, causes a screen for receiving an instruction from a user to start transport of a sheet of paper P in the paper processing apparatus 200 to be displayed on the display device 150 of the image forming apparatus 100.

The output unit 178, which is an example of an output unit, gives the paper processing apparatus 200 an instruction to start transport of a sheet of paper P whose transport has been stopped in the paper processing apparatus 200.

Figure 4A:
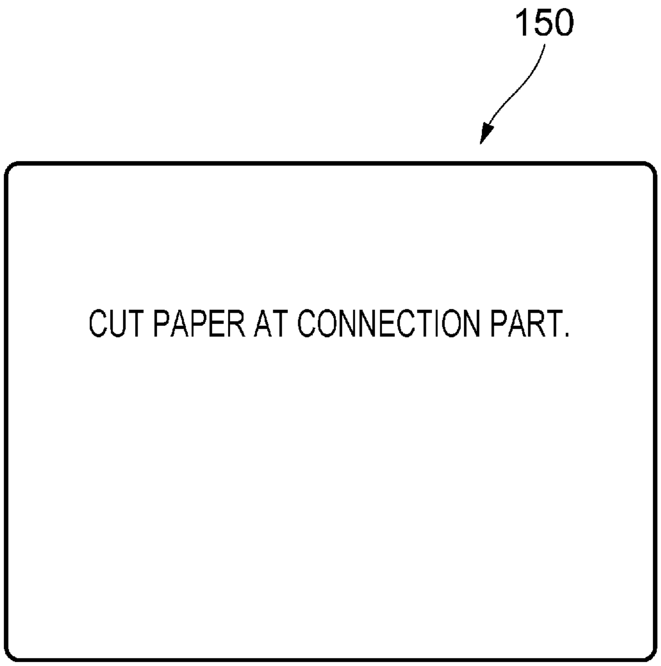
FIGS. 4A and 4B each illustrate a display example on a display device of the image forming apparatus.
Figure 4B:
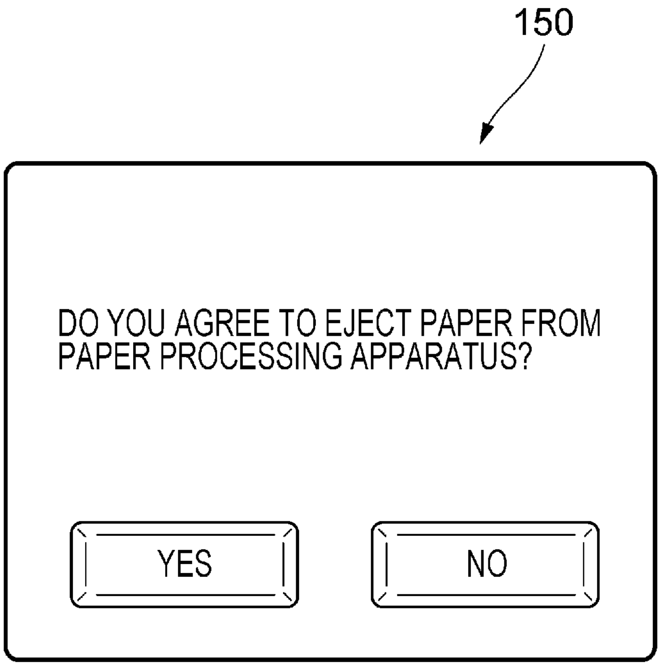

FIGS. 4A and 4B each illustrate a display example on the display device 150 of the image forming apparatus 100.

In the present exemplary embodiment, the notification unit 175 gives a predetermined notification in a case where transport of a sheet of paper P by the upstream-side transport unit 110 and the downstream-side transport unit 210 has been stopped and a sheet of paper P whose transport by the upstream-side transport unit 110 has been stopped has already reached the paper processing apparatus 200.

In the present exemplary embodiment, transport of a sheet of paper P by the upstream-side transport unit 110 and the downstream-side transport unit 210 is stopped upon detection of jam of a sheet of paper P in the image forming apparatus 100 or the paper processing apparatus 200.

In particular, in the present exemplary embodiment, the paper detection sensors S are provided for detection of a sheet of paper P in the image forming apparatus 100, and the paper detection sensors X are provided for detection of a sheet of paper P in the paper processing apparatus 200. In a case where a sheet of paper P is not detected at a timing at which the sheet of paper P is scheduled to be detected, the control device 170 determines that jam of a sheet of paper P has occurred.

In this case, the control device 170 supplies a control signal to the upstream-side transport unit 110 and the downstream-side transport unit 210 to stop transport of a sheet of paper P by the upstream-side transport unit 110 and the downstream-side transport unit 210.

In the present exemplary embodiment, in a case where transport of a sheet of paper P by the upstream-side transport unit 110 and the downstream-side transport unit 210 has been stopped and a sheet of paper P whose transport by the upstream-side transport unit 110 has been stopped has already reached the paper processing apparatus 200, the notification unit 175 gives a predetermined notification.

In other words, in a case where transport of a sheet of paper P by the upstream-side transport unit 110 and the downstream-side transport unit 210 has been stopped and a sheet of paper P is present in both of the image forming apparatus 100 and the paper processing apparatus 200, the notification unit 175 gives a predetermined notification.

Specifically, the notification unit 175 gives a user a predetermined notification illustrated in FIG. 4A on the display device 150 of the image forming apparatus 100.

More specifically, in the present exemplary embodiment, the notification unit 175 gives a user a notification illustrated in FIG. 4A in a case where transport of a sheet of paper P by the upstream-side transport unit 110 and the downstream-side transport unit 210 has been stopped and a distance over which a sheet of paper P has been fed toward the paper processing apparatus 200 by the upstream-side transport unit 110 is larger than a predetermined distance.

In the present exemplary embodiment, the distance over which a sheet of paper P has been fed toward the paper processing apparatus 200 by the upstream-side transport unit 110 is grasped on the basis of an elapsed period from detection of a front end of the sheet of paper P by the downstream paper detection sensor S3 (see FIG. 1) to stoppage of transport of the sheet of paper P.

The distance over which the sheet of paper P has been fed becomes larger as this elapsed period becomes longer. In a case where this elapsed period is longer than a predetermined period, the notification unit 175 gives a user a notification illustrated in FIG. 4A.

By giving the notification illustrated in FIG. 4A, the notification unit 175 prompts the user to take an action for reducing occurrence of a trouble resulting from a state where a sheet of paper P whose transport by the upstream-side transport unit 110 has been stopped has already reached the paper processing apparatus 200.

In particular, the notification unit 175 gives a notification that prompts the user to take an action for reducing occurrence of a trouble that can occur in the image forming apparatus 100 due to start of transport, in the paper processing apparatus 200, of the sheet of paper P that has been stopped and has already reached the paper processing apparatus 200.

More specifically, in this example, the notification unit 175 gives a notification "CUT PAPER AT CONNECTION PART." prompting the user to cut the sheet of paper P that has been stopped and has already reached the paper processing apparatus 200 as illustrated in FIG. 4A.

More specifically, in the present exemplary embodiment, the notification unit 175 gives a notification prompting the user to cut the sheet of paper P by using the cutting blade K2 (see FIG. 1).

Figure 5:
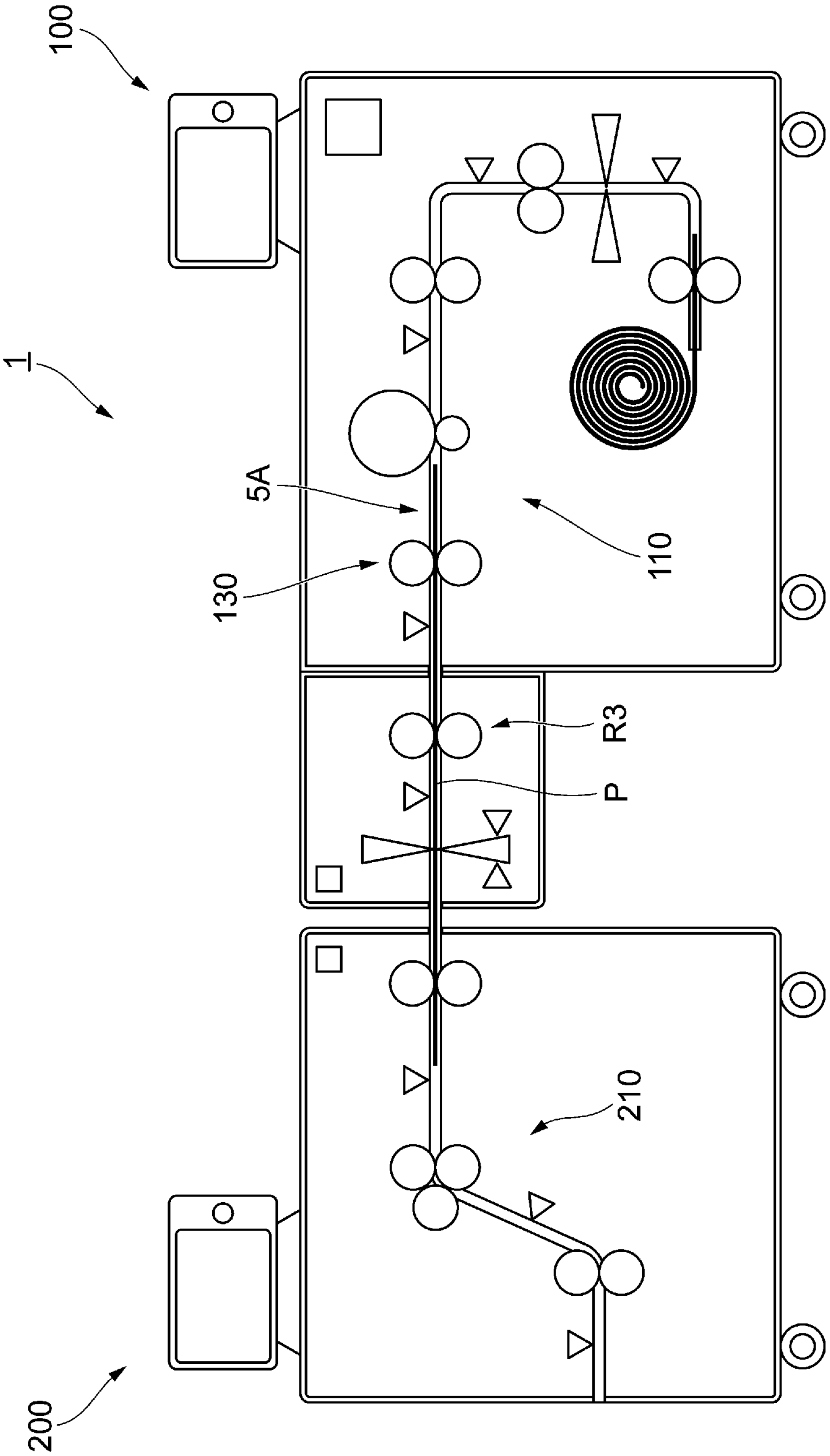
FIG. 5 illustrates a state where a sheet of paper whose transport by an upstream-side transport unit and a downstream-side transport unit has been stopped has already reached the paper processing apparatus as a result of transport by the upstream-side transport unit.

FIG. 5 illustrates a state where transport of a sheet of paper P by the upstream-side transport unit 110 and the downstream-side transport unit 210 has been stopped and a sheet of paper P transported by the upstream-side transport unit 110 has already reached the paper processing apparatus 200.

If transport of the sheet of paper P in the paper processing apparatus 200 starts in this state, the sheet of paper P is forcibly transported in the image forming apparatus 100. This may stain and damage an inside of the image forming apparatus 100.

Specifically, in the state illustrated in FIG. 5, unfixed toner is present in a part indicated by reference sign 5A. If the sheet of paper P is forcibly transported in the image forming apparatus 100, this unfixed toner may be attached, for example, to the fixing unit 130 and the downstream transport roll pair R3, thereby staining and damaging the inside of the image forming apparatus 100.

Furthermore, if the sheet of paper P is forcibly transported in the image forming apparatus 100, the transported sheet of paper P drives a part that is not supposed to be driven. This may undesirably break a device.

In view of this, in the present exemplary embodiment, the notification unit 175 gives a notification prompting the user to take an action for reducing occurrence of such a trouble as described above.

More specifically, the notification unit 175 gives a notification prompting the user to take an action for reducing occurrence of a trouble in the image forming apparatus 100 resulting from a state where a sheet of paper P that has been stopped in the image forming apparatus 100 has already reached the paper processing apparatus 200.

More specifically, the notification unit 175 gives a notification prompting the user to take an action for reducing occurrence of a trouble that can occur in the image forming apparatus 100 due to start of transport of the sheet of paper P in the paper processing apparatus 200.

More specifically, for example, the notification unit 175 gives a notification prompting the user to cut the sheet of paper P that has been stopped and has already reached the paper processing apparatus 200 as illustrated in FIG. 4A.

Figure 6:
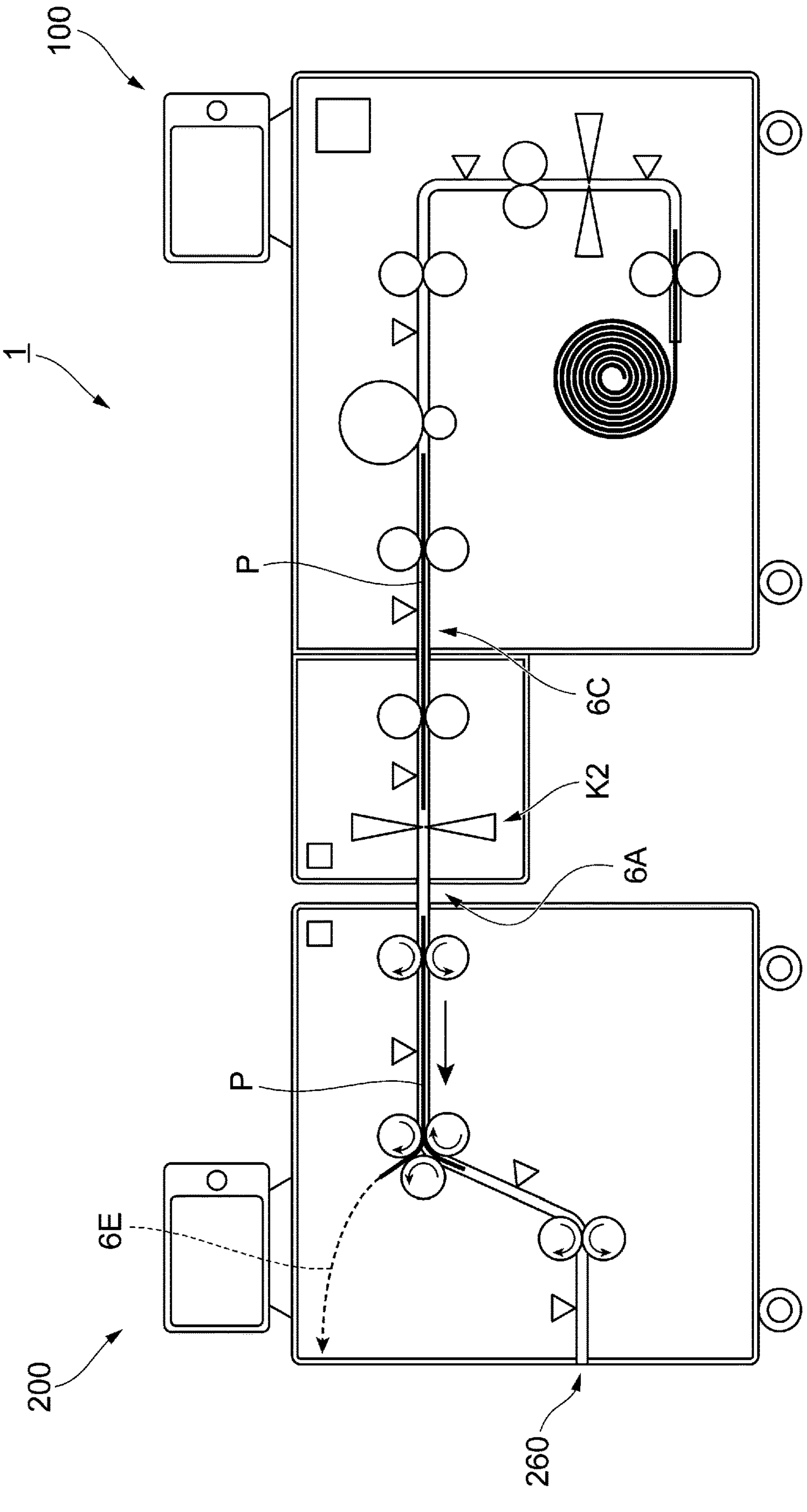
FIG. 6 illustrates a state of the paper processing system after a sheet of paper has been cut by a cutting blade.

FIG. 6 illustrates a state of the paper processing system 1 obtained after the sheet of paper P is cut by the cutting blade K2.

When the user cuts the sheet of paper P, the sheet of paper P is divided as indicated by reference sign 6A in FIG. 6.

Since the sheet of paper P is divided, the sheet of paper P (the sheet of paper P indicated by reference sign 6C) in the image forming apparatus 100 does not move even if transport of the sheet of paper P starts in the paper processing apparatus 200.

This suppresses occurrence of a trouble resulting from the state where the sheet of paper P that has been stopped in the image forming apparatus 100 has already reached the paper processing apparatus 200.

When transport of the sheet of paper P starts in the paper processing apparatus 200, the sheet of paper P moves in a direction indicated by reference sign 6E and is ejected from the paper processing apparatus 200.

In particular, in the present exemplary embodiment, a sheet of paper P that has been properly folded is transported toward the paper output unit 260, but a sheet of paper P to be ejected after jam of a sheet of paper P is not transported toward the paper output unit 260 but is ejected from the paper processing apparatus 200 through another route.

The "action for reducing occurrence of a trouble" is not limited to an action directly connected to reduction of occurrence of a trouble and encompasses an action for reducing a possibility of occurrence of a trouble. In other words, the "action for reducing occurrence of a trouble" is not limited to an action that reduces occurrence of a trouble with certainty and encompasses an action that leads to reduction of occurrence of a trouble.

The action of cutting the sheet of paper P by using the cutting blade K2 is an action directly connected to reduction of occurrence of a trouble. Meanwhile, an action of checking the connection part C, which will be described later, is an action for reducing a possibility of occurrence of a trouble.

See FIGS. 4A and 4B again. A display example on the display device 150 is further described.

In the present exemplary embodiment, after the notification unit 175 gives the user the notification illustrated in FIG. 4A, the display controller 177 causes a predetermined screen to be displayed on the display device 150 of the image forming apparatus 100.

Specifically, the display controller 177 causes a screen (hereinafter referred to as a "reception screen") for receiving an instruction from the user to start transport of the sheet of paper P in the paper processing apparatus 200 to be displayed on the display device 150 of the image forming apparatus 100 as illustrated in FIG. 4B.

More specifically, the display controller 177 causes the reception screen to be displayed, for example, after elapse of a predetermined period from issuance of the notification by the notification unit 175.

When the user gives an instruction to start transport, for example, selects "YES" displayed on the reception screen, the output unit 178 supplies the instruction to start transport of the sheet of paper P to the paper processing apparatus 200. As a result, transport of the sheet of paper P starts in the paper processing apparatus 200.

This causes the sheet of paper P that has been stopped in the paper processing apparatus 200 to be ejected from the paper processing apparatus 200.

In the present exemplary embodiment, the paper processing apparatus 200 automatically ejects a sheet of paper P as described above, but a user manually removes a sheet of paper P which has been stopped in the image forming apparatus 100.

More specifically, a user manually removes a sheet of paper P that has been stopped on the transport path R100 (see FIG. 1), for example, by opening a covering of the image forming apparatus 100.

Although an example in which a reception screen is displayed after elapse of a predetermined period from issuance of a notification by the notification unit 175 has been described above, a timing at which the reception screen is displayed is not limited to this.

The reception screen may be displayed in a case where a user actually takes the action for reducing occurrence of a trouble.

More specifically, the display controller 177 may display a reception screen in a case where a user actually cuts a sheet of paper P by using the cutting blade K2.

Whether or not a sheet of paper P has been actually cut by using the cutting blade K2 is determined on the basis of output from the cutting blade detection sensors SK (see FIG. 1).

When a sheet of paper P is cut by the cutting blade K2, a shift occurs from a state where the cutting blade K2 is being detected by the cutting blade detection sensor SK1 to a state where the cutting blade K2 is being detected by the cutting blade detection sensor SK2.

Alternatively, when a sheet of paper P is cut by the cutting blade K2, a shift occurs from a state where the cutting blade K2 is being detected by the cutting blade detection sensor SK2 to a state where the cutting blade K2 is being detected by the cutting blade detection sensor SK1.

When the cutting blade K2 is newly detected by the cutting blade detection sensor SK1 or the cutting blade detection sensor SK2 as described above, the display controller 177 displays the reception screen.

Figure 7A:
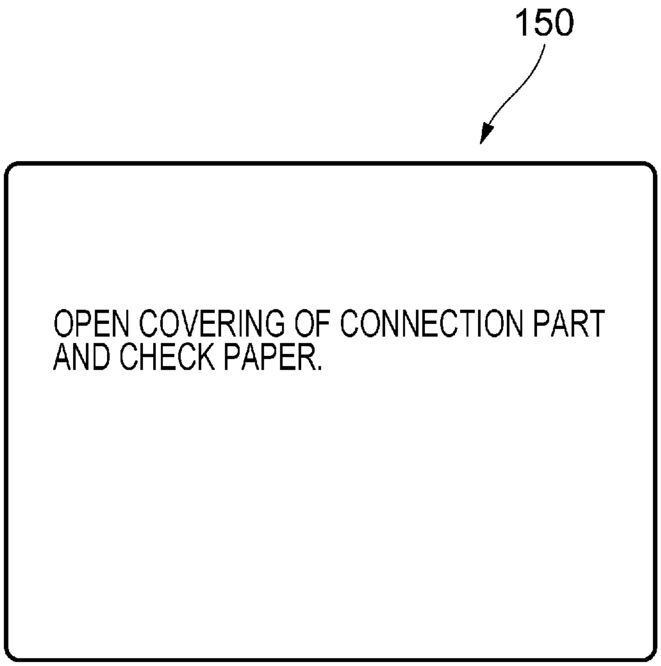
FIGS. 7A and 7B each illustrate another display example on the display device of the image forming apparatus.
Figure 7B:
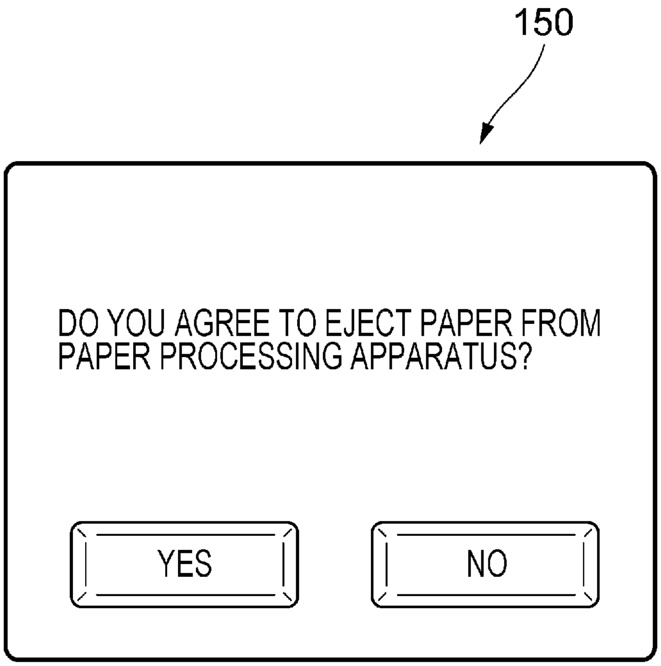

FIGS. 7A and 7B each illustrate another display example on the display device 150 of the image forming apparatus 100.

In this display example, the notification unit 175 gives a notification prompting the user to check the connection part C in which the image forming apparatus 100 and the paper processing apparatus 200 are connected as illustrated in FIG. 7A.

In other words, in this example, the notification unit 175 gives a notification prompting the user to check whether or not a sheet of paper P whose transport by the upstream-side transport unit 110 has been stopped has already reached the paper processing apparatus 200.

More specifically, in this example, the notification unit 175 gives a notification prompting the user to check a state of the sheet of paper P in the connection part C by opening the cover member 300 (see FIG. 1) provided in the connection part C.

Figure 8:
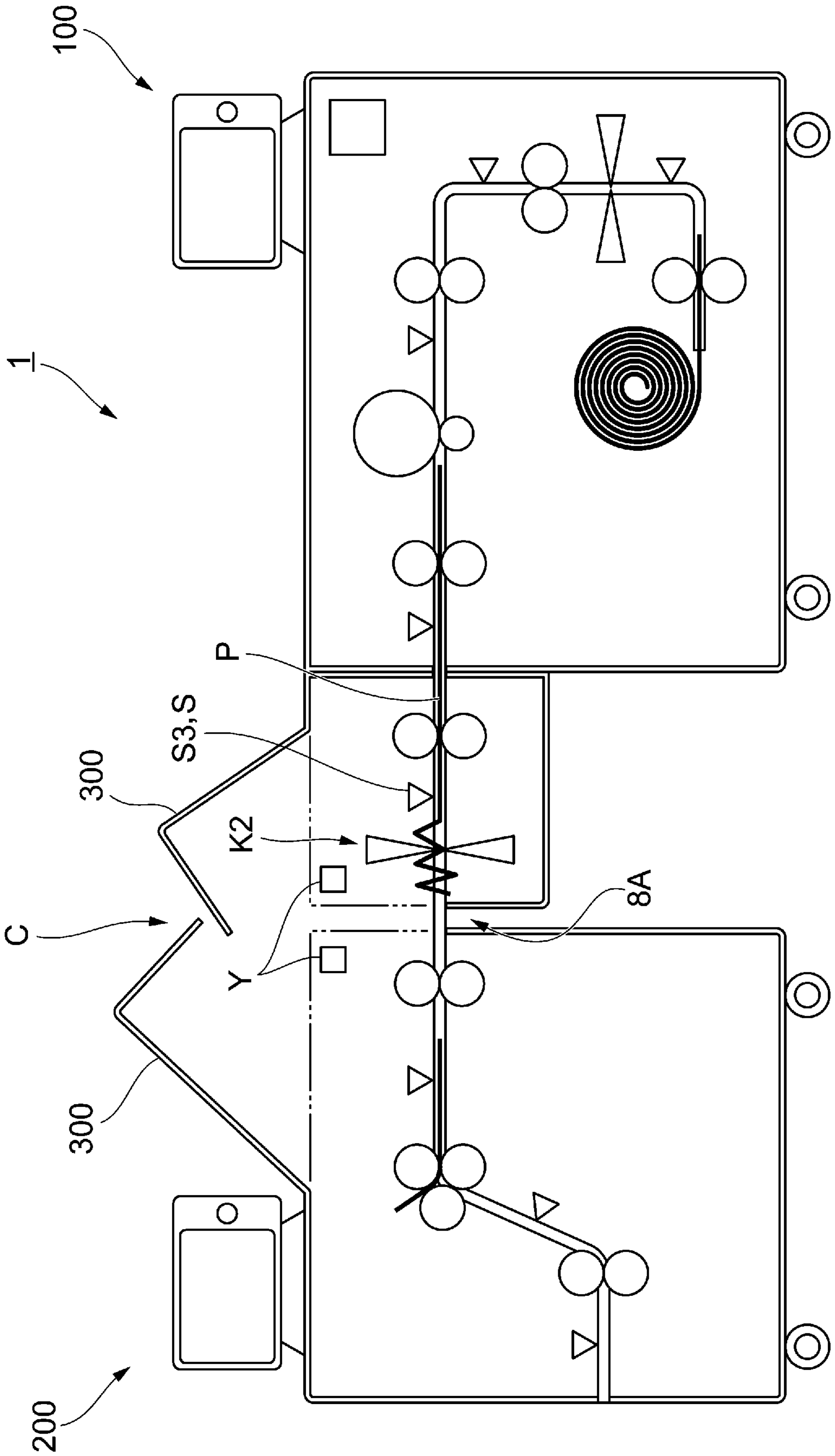
FIG. 8 illustrates a paper processing system in which a cover member is opened.

In the present exemplary embodiment, when the cover member 300 is opened, the paper processing system 1 shifts to a state illustrated in FIG. 8, which illustrates the paper processing system 1 in which the cover member 300 is opened.

In this case, the user can check an inside of the image forming apparatus 100 and an inside of the paper processing apparatus 200 and therefore can check whether or not a sheet of paper P is present in both of the image forming apparatus 100 and the paper processing apparatus 200.

In a case where such a notification prompting the user to check the connection part C is given, a thin strip of cut paper is less likely to be generated.

In a case where the notification unit 175 gives only a notification prompting a user to cut a sheet of paper P, a short strip of cut paper is more likely to be generated and remain in the image forming apparatus 100.

Specifically, the configuration of the present exemplary embodiment may cause a situation in which a sheet of paper P is stopped near the cutting blade K2 due to jam of the sheet of paper P in the middle of transport of the sheet of paper P from the image forming apparatus 100 toward the paper processing apparatus 200 as indicated by reference sign in FIG. 8.

When the sheet of paper P is cut by the cutting blade K2 in this state, a strip of cut paper is likely to be generated. This strip of cut paper may slip into a place beyond the reach of the user. In such a case, the strip of cut paper cannot be removed.

More specifically, a covering member (not illustrated) for ensuring safety is provided around the cutting blade K2. When a strip of cut paper is generated, this strip of cut paper may remain on an inner side of the covering member. In such a case, the strip of paper cannot be removed.

In a case where a notification prompting the user to check the connection part C as illustrated in FIG. 7A instead of a notification prompting the user to cut the sheet of paper P, the user first opens the cover member 300 and visually checks the connection part C.

In this case, the user performs a cutting process in a case where the sheet of paper P has already reached the paper processing apparatus 200. Meanwhile, the cutting process is omitted in a case where the sheet of paper P has not reached the paper processing apparatus 200. In this case, occurrence of a strip of cut paper is suppressed.

In the present exemplary embodiment, the determining unit 176 (see FIG. 3) is provided. The determining unit 176 determines whether or not a sheet of paper P whose transport by the upstream-side transport unit 110 has been stopped has already reached the paper processing apparatus 200.

Specifically, the determining unit 176 estimates a position of a front end of a sheet of paper P on the basis of an elapsed period from passage of the sheet of paper P through the downstream paper detection sensor S3 (see FIG. 8) to stoppage of transport of the sheet of paper P and determines whether or not the sheet of paper P has reached the paper processing apparatus 200 on the basis of the estimated position.

In a case where such a determining process is performed, the determining unit 176 may sometimes determine that the sheet of paper P has already reached the paper processing apparatus 200 even if the sheet of paper P has been stopped near the cutting blade K2 as illustrated in FIG. 8. In this case, in a case where a notification prompting the user to cut the sheet of paper P is given, a strip of cut paper is likely to be generated.

In particular, if accuracy of determination as to whether or not a sheet of paper P has already reached the paper processing apparatus 200 is high, a notification prompting a user to cut the sheet of paper P need just be given always when it is determined that the sheet of paper P has already reached the paper processing apparatus 200. In this case, the sheet of paper P can be cut while suppressing occurrence of a strip of cut paper.

However, in the present exemplary embodiment, the determining unit 176 sometimes determines that the sheet of paper P has already reached the paper processing apparatus 200 even if the sheet of paper P has not actually reached the paper processing apparatus 200. If a notification prompting a user to cut the sheet of paper P is given in such a case, a strip of cut paper may be undesirably generated.

Meanwhile, in a case where a notification prompting a user to check the connection part C is given as described above, occurrence of a strip of cut paper can be suppressed even if the determining unit 176 determines that the sheet of paper P has already reached the paper processing apparatus 200 although the sheet of paper P has not actually reached the paper processing apparatus 200.

In particular, occurrence of a strip of cut paper is suppressed in a case where a notification prompting a user to check the connection part C is given even if the determining unit 176 determines that a sheet of paper P that has been stopped has already reached the paper processing apparatus 200.

In particular, in a case where a notification prompting a user to check the connection part C is given, occurrence of a strip of cut paper is suppressed even if the determining unit 176 makes an erroneous determination.

Then, in the display example illustrated in FIG. 7, a screen illustrated in FIG. 7B is displayed.

In FIG. 7B, a reception screen inquiring the user as to whether or not to eject the sheet of paper P from the paper processing apparatus 200 is displayed as in the above case.

For example, when the user selects "YES", transport of the sheet of paper P starts in the paper processing apparatus 200.

As in the above case, this reception screen is displayed, for example, after elapse of a predetermined period from issuance of the notification prompting the user to check the connection part C.

Alternatively, the reception screen may be displayed, for example, in a case where the user actually checks the connection part C.

In the present exemplary embodiment, whether or not the user has actually checked the connection part C is determined on the basis of output from the opening closing detection sensor Y (see FIG. 8). In other words, whether or not the user has actually checked the connection part C is determined on the basis of whether or not the cover member 300 has been opened.

When the cover member 300 is opened, the opening closing detection sensor Y detects opening of the cover member 300. Upon detection of opening of the cover member 300 by the opening closing detection sensor Y, the display controller 177 displays the reception screen.

In the present exemplary embodiment, the two cover members 300 are provided. The reception screen may be displayed when one of the two cover members 300 is opened. Alternatively, the reception screen may be displayed when both of the two cover members 300 are opened.

Note that the notification prompting a user to cut a sheet of paper P and the notification prompting a user to check the connection part C may be given in a case where the user gives an instruction to start transport of the sheet of paper P in the paper processing apparatus 200.

In other words, the above notifications (hereinafter referred to as a "reducing notification") prompting a user to take an action for reducing occurrence of a trouble may be given in a case where the user gives an instruction (hereinafter referred to as a "transport start instruction") to start transport of the sheet of paper P in the paper processing apparatus 200.

Figure 9A:
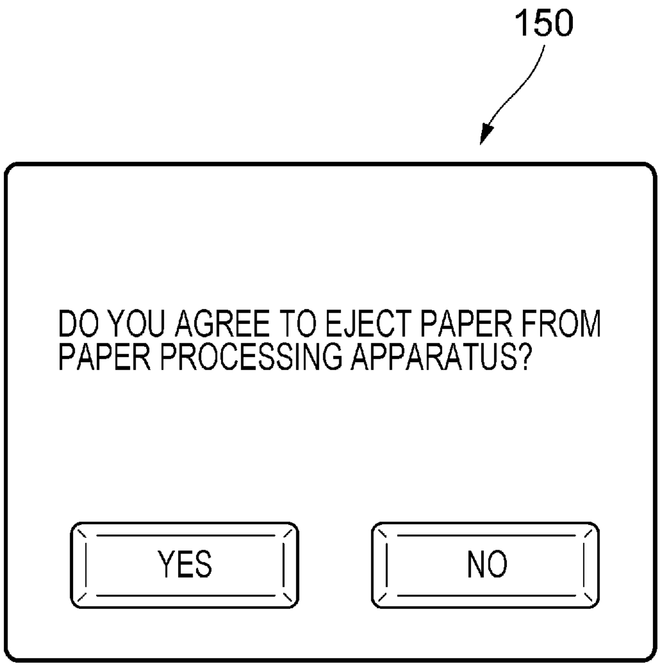
FIGS. 9A and 9B each illustrate another display example on the display device.

In a case where a reducing notification is given upon receipt of a transport start instruction, the display controller 177 first causes a reception screen to be displayed as illustrated in FIG. 9A, which illustrates another display example of the display device 150.

In other words, in a case where transport of a sheet of paper P is stopped by the upstream-side transport unit 110 and the downstream-side transport unit 210 due to jam of the sheet of paper P, first, a user is inquired about whether or not to eject the sheet of paper P from the paper processing apparatus 200.

Figure 9B:
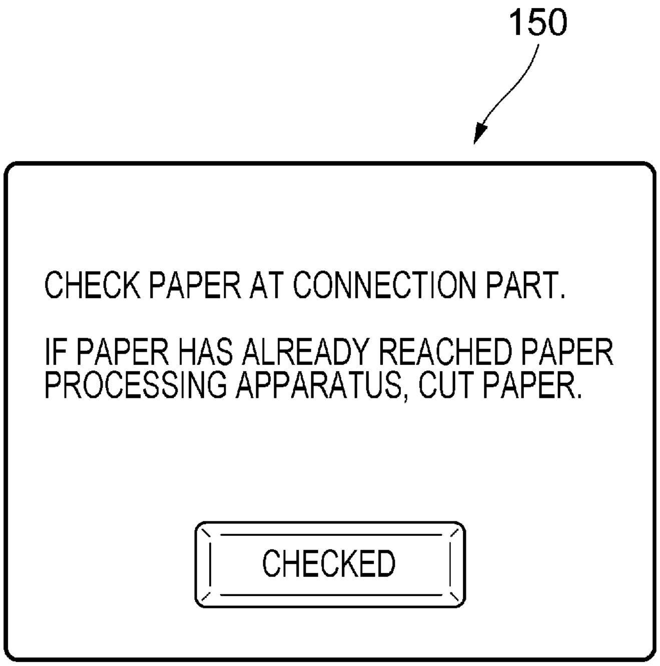

In this processing example, when the user selects "YES", the notification unit 175 gives a notification prompting the user to check the connection part C and a notification prompting the user to cut the sheet of paper P in a case where the sheet of paper P has already reached the paper processing apparatus 200 as illustrated in FIG. 9B.

In other words, in this processing example, in a case where the user gives an instruction to start transport of the sheet of paper P in the paper processing apparatus 200, the notification unit 175 gives a notification prompting the user to take an action for reducing occurrence of a trouble in the image forming apparatus 100.

Then, in this processing example, when the user selects a button "CHECKED" on the screen illustrated in FIG. 9B, transport of the sheet of paper P actually starts in the paper processing apparatus 200.

When this transport actually starts, it is highly likely that the sheet of paper P has been cut or the sheet of paper P has not reached the paper processing apparatus 200.

In this case, it is highly likely that the sheet of paper P is transported in the paper processing apparatus 200 without occurrence of forced transfer of the sheet of paper P in the image forming apparatus 100.

The aforementioned troubles resulting from transport of the sheet of paper P in the paper processing apparatus 200 occur in a case where a user gives a transport start instruction.

The aforementioned troubles do not occur in a case where no transport start instruction is given by a user and there is no risk of forced transfer of a sheet of paper P.

In view of this, in the processing example described in FIG. 9, first, a user is inquired about whether or not the user has intention to perform transport of the sheet of paper P by the paper processing apparatus 200.

In a case where the user has intention to perform transport of the sheet of paper P by the paper processing apparatus 200, there is a risk of occurrence of the aforementioned troubles, and therefore a notification prompting the user to reduce occurrence of a trouble is given as illustrated in FIG. 9B.

In this processing example, a notification prompting the user to reduce occurrence of a trouble is not given in a case where the user has no intention to perform transport of the sheet of paper P by the paper processing apparatus 200.

More specifically, in a case where the user has no intention to perform transport of the sheet of paper P by the paper processing apparatus 200, the user selects "NO" on the screen illustrated in FIG. 9A. In this case, the screen illustrated in FIG. 9B is not displayed.

In the display example illustrated in FIGS. 4A and 4B and 7A and 7B, a notification prompting a user to take an action for reducing occurrence of a trouble is given even if the user does not desire transport in the paper processing apparatus 200 and a trouble is hard to occur.

Meanwhile, in the processing example illustrated in FIGS. 9A and 9B, a notification prompting a user to take an action for reducing occurrence of a trouble is omitted in a case where the user has no intention to perform transport of the sheet of paper P by the paper processing apparatus 200. This makes it unnecessary for the user to take an unnecessary action.

Next, an instruction output by the output unit 178 (see FIG. 3) is described.

The output unit 178 gives the paper processing apparatus 200 an instruction to start transport of the sheet of paper P in the paper processing apparatus 200 in which transport of the sheet of paper P has been stopped.

This starts transport of the sheet of paper P in the paper processing apparatus 200. As a result, the sheet of paper P that has been stopped in the paper processing apparatus 200 is ejected.

The output unit 178 according to the present exemplary embodiment does not output an instruction to start transport in a case where the sheet of paper P whose transport by the upstream-side transport unit 110 has been stopped has already reached the paper processing apparatus 200.

More specifically, the output unit 178 does not output an instruction start transport in a case where the determining unit 176 determines that the sheet of paper P whose transport by the upstream-side transport unit 110 has been stopped has already reached the paper processing apparatus 200. This can avoid the forced transport.

However, the output unit 178 outputs an instruction start transport upon receipt of an instruction from a user as described above even in a case where the determining unit 176 determines that the sheet of paper P whose transport by the upstream-side transport unit 110 has been stopped has already reached the paper processing apparatus 200.

Specifically, in the present exemplary embodiment, a reception screen is displayed in some cases as described above. When a user gives an instruction to start transport on this reception screen, the output unit 178 gives the instruction to start transport to the paper processing apparatus 200. This causes the sheet of paper P that has been stopped in the paper processing apparatus 200 to be ejected from the paper processing apparatus 200.

Alternatively, the output unit 178 may output an instruction to start transport irrespective of an instruction from the user after the notification unit 175 gives the aforementioned notification to the user.

More specifically, for example, the output unit 178 may output an instruction to start transport to the paper processing apparatus 200 irrespective of an instruction from the user after elapse of a predetermined period from issuance of the notification to the user by the notification unit 175.

Alternatively, the output unit 178 may output an instruction to start transport to the paper processing apparatus 200 in a case where the notification unit 175 gives the above notification to the user and the user gives an instruction to start transport.

Alternatively, the output unit 178 may output an instruction to start transport to the paper processing apparatus 200 in a case where the notification unit 175 gives the above notification to the user and the user actually takes any of the above actions for reducing occurrence of a trouble.

Alternatively, the output unit 178 may output an instruction to start transport to the paper processing apparatus 200 in a case where the notification unit 175 gives the above notification to the user and the user actually takes any of the above actions for reducing occurrence of a trouble and gives an instruction to start transport.

Other Remarks

Although an example in which a "notification prompting a user to take an action for reducing occurrence of a trouble" is displayed on the display device 150 has been described above, this configuration is not restrictive. A "notification prompting a user to take an action for reducing occurrence of a trouble" may be given as voice from a speaker (not illustrated).

A case where the above notification is given in a case where a sheet of paper P whose transport by the upstream-side transport unit 110 has been stopped has already reached the paper processing apparatus 200 has been described above.

However, this configuration is not restrictive. The above notification may be given when transport of the sheet of paper P by the upstream-side transport unit 110 and the downstream-side transport unit 210 has been stopped irrespective of whether or not the sheet of paper P has already reached the paper processing apparatus 200.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording material transport device comprising:

a transport unit that transports a recording material to a succeeding apparatus that follows the recording material transport device;

a sensor configured to detect a presence of the recording material at a predetermined position; and a processor programmed to:

detect that a jam has occurred, based on output from the sensor, and control transport of the recording material by the transport unit to be stopped due to the jam, and generate a notification with specific instructions that prompts a user to take a physical action for manipulating the recording material transport device and reducing occurrence of a trouble resulting from a state where the recording material that has been stopped has already reached the succeeding apparatus, and the notification prompts the user to cut the recording material that has been stopped and has already reached the succeeding apparatus, or prompts the user to check a connection part in which the recording material transport device and the succeeding apparatus are connected.

2. The recording material transport device according to claim 1, wherein the processor generates the notification prompting the user to cut the recording material in a case where the user gives an instruction to start transport of the recording material in the succeeding apparatus in which transport of the recording material has been stopped.

3. The recording material transport device according to claim 1, wherein the processor generates the notification prompting the user to check the connection part in a case where the user gives an instruction to start transport of the recording material in the succeeding apparatus in which transport of the recording material has been stopped.

4. The recording material transport device according to claim 1, wherein the processor further comprises a display controller that displays a screen for receiving an instruction from the user to start transport of the recording material in the succeeding apparatus, and wherein the display controller displays the screen for receiving the instruction in a case where the user takes the action for reducing occurrence of a trouble.

5. The recording material transport device according to claim 1, wherein the processor is programmed to determine whether or not the recording material whose transport by the transport unit has been stopped has already reached the succeeding apparatus, and wherein the processor generates the notification prompting the user to check the connection part even in a case where the processor determines that the recording material that has been stopped has already reached the succeeding apparatus.

6. The recording material transport device according to claim 1, wherein the processor generates the notification so as to prompt the user to check whether or not the recording material whose transport by the transport unit has been stopped has already reached the succeeding apparatus.

7. The recording material transport device according to claim 1, wherein the processor generates the notification prompting the user to take the action for reducing occurrence of a trouble in a case where a distance over which the recording material whose transport by the transport unit has been stopped has been fed toward the succeeding apparatus by the transport unit is larger than a predetermined distance.

8. The recording material transport device according to claim 1, wherein the processor is programmed to give the succeeding apparatus an instruction to start transport of the recording material in the succeeding apparatus in which transport of the recording material has been stopped, and wherein the processor does not give the instruction to start transport in a case where the recording material whose transport by the transport unit has been stopped has already reached the succeeding apparatus.

9. The recording material transport device according to claim 8, wherein the processor gives the instruction to start transport in response to detecting receipt of an instruction from the user.

10. The recording material transport device according to claim 1, wherein the processor is programmed to give the succeeding apparatus an instruction to start transport of the recording material in the succeeding apparatus in which transport of the recording material has been stopped, and wherein the processor gives the instruction to start transport after the processor gives the notification to the user.

11. The recording material transport device according to claim 10, wherein the processor gives the instruction to start transport in a case where the processor gives the notification to the user and the user gives an instruction.

12. The recording material transport device according to claim 10, wherein the processor gives the instruction to start transport in a case where the notification gives the notification to the user and the user takes the action for reducing occurrence of a trouble.

13. The recording material transport device according to claim 12, wherein the processor gives the instruction to start transport in a case where the user further gives an instruction.

14. An image forming apparatus comprising:

an image forming unit that forms an image on a recording material; and a recording material transport device that transports the recording material, wherein the recording material transport device comprises the recording material transport device according to claim 1.

15. A recording material transport device comprising:

transport means for transporting a recording material to a succeeding apparatus that follows the recording material transport device;

sensor means for detecting a presence of the recording material at a predetermined position;

detecting means for detecting that a jam has occurred, based on output from the sensor means; and notification means for, in a case where transport of the recording material by the transport means has been stopped, generating a notification with specific instructions that prompts a user to take a physical action for manipulating the recording material transport device and for reducing occurrence of a trouble resulting from a state where the recording material that has been stopped has already reached the succeeding apparatus, and the notification prompts the user to cut the recording material that has been stopped and has already reached the succeeding apparatus, or prompts the user to check a connection part in which the recording material transport device and the succeeding apparatus are connected.

* * * * *